(12) United States Patent
Yap (10) Patent No.: US 11,224,943 B2
(45) Date of Patent: Jan. 18, 2022

(54) VARIABLE BEAM GEOMETRY LASER-BASED POWDER BED FUSION

(71) Applicant: DIVERGENT TECHNOLOGIES, INC., Los Angeles, CA (US)

(72) Inventor: Chor Yen Yap, Gardena, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/914,874

(22) Filed: Mar. 7, 2018

(65) Prior Publication Data

US 2019/0275612 A1 Sep. 12, 2019

(51) Int. Cl.
| | |
|---|---|
| *B23K 26/34* | (2014.01) |
| *B33Y 10/00* | (2015.01) |
| *B33Y 30/00* | (2015.01) |
| *B23K 26/342* | (2014.01) |
| *B23K 26/03* | (2006.01) |
| *B23K 26/08* | (2014.01) |
| *B23K 26/06* | (2014.01) |
| *B23K 26/073* | (2006.01) |

(52) U.S. Cl.
CPC .......... *B23K 26/342* (2015.10); *B23K 26/034* (2013.01); *B23K 26/0626* (2013.01); *B23K 26/0648* (2013.01); *B23K 26/073* (2013.01); *B23K 26/0876* (2013.01)

(58) Field of Classification Search
CPC .. B23K 26/34-342; B33Y 10/00; B33Y 30/00
See application file for complete search history.

(56) References Cited

U.S. PATENT DOCUMENTS

| | | | |
|---|---|---|---|
| 5,203,226 A | 4/1993 | Hongou et al. |
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |

(Continued)

FOREIGN PATENT DOCUMENTS

| | | |
|---|---|---|
| DE | 102015202347 A1 | 8/2016 |
| WO | 1996036455 A1 | 11/1996 |

(Continued)

OTHER PUBLICATIONS

US 9,202,136 B2, 12/2015, Schmidt et al. (withdrawn)

(Continued)

*Primary Examiner* — Michael A Laflame, Jr.
(74) *Attorney, Agent, or Firm* — Arent Fox LLP (57) ABSTRACT

Systems and methods of adapting the geometrical shape of a laser beam in laser-based powder-bed fusion (PBF) are provided. An apparatus for laser-based powder-bed fusion includes a depositor that deposits a plurality of layers of a powder material. The apparatus further includes a laser beam source that generates a laser beam having a variable beam geometry. A laser application component applies the laser beam in one of a plurality of beam geometries to fuse the powder material to construct a build piece.

42 Claims, 9 Drawing Sheets

(56) References Cited

U.S. PATENT DOCUMENTS

| | | |
|---|---|---|
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |

(56) References Cited

U.S. PATENT DOCUMENTS

| | | |
|---|---|---|
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |

(56) References Cited

U.S. PATENT DOCUMENTS

| | | |
|---|---|---|
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 10,919,090 B2 | 2/2021 | Feldmann et al. |
| 2006/0108783 A1 | 5/2006 | Ni et al. |
| 2013/0270750 A1* | 10/2013 | Green .................. B22F 3/1055 264/497 |
| 2013/0300035 A1 | 11/2013 | Snis |
| 2014/0271328 A1* | 9/2014 | Burris .................. B23K 26/034 419/53 |
| 2014/0277669 A1 | 9/2014 | Nardi et al. |
| 2016/0114432 A1* | 4/2016 | Ferrar .................. B23K 26/082 219/76.12 |
| 2016/0184925 A1 | 6/2016 | Huang et al. |
| 2016/0339639 A1* | 11/2016 | Chivel .................. B33Y 10/00 |
| 2017/0008126 A1* | 1/2017 | Long .................. B22F 3/105 |
| 2017/0021454 A1 | 1/2017 | Dallarosa et al. |
| 2017/0113344 A1 | 4/2017 | Schonberg |
| 2017/0120332 A1 | 5/2017 | DeMuth et al. |
| 2017/0165792 A1 | 6/2017 | Buller et al. |
| 2017/0282294 A1* | 10/2017 | Uchida .................. B33Y 10/00 |
| 2017/0304946 A1 | 10/2017 | Shibazaki |
| 2017/0320168 A1 | 11/2017 | Martinsen |
| 2017/0341309 A1 | 11/2017 | Piepenbrock et al. |

FOREIGN PATENT DOCUMENTS

| | | |
|---|---|---|
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017015241 A1 | 1/2017 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion dated May 17, 2019, regarding PCT/US2019/020789.

* cited by examiner

VARIABLE BEAM GEOMETRY LASER-BASED POWDER BED FUSION

BACKGROUND

Field

The present disclosure relates generally to additive manufacturing, and more particularly, to variable beam geometry laser-based powder bed fusion.

Background

Powder-bed fusion (PBF) systems can produce metal structures (referred to as build pieces) with geometrically complex shapes, including some shapes that are difficult or impossible to create with conventional manufacturing processes. PBF systems include additive manufacturing (AM) techniques to create build pieces layer-by-layer. Each layer or slice can be formed by a process of depositing a layer of metal powder and then fusing (e.g., melting and cooling) areas of the metal powder layer that coincide with the cross-section of the build piece in the layer. The process may be repeated to form the next slice of the build piece, and so on until the build piece is complete. Because each layer is deposited on top of the previous layer, PBF may be likened to forming a structure slice-by-slice from the ground up.

Laser-based PBF may be useful for manufacturing complex geometries and with reduced cost of customization. Unfortunately, manufacturing using laser-based PBF systems can be a slow process compared to what may be needed for high-capacity production. Application of high-power laser systems in current PBF systems may lead to vaporization of materials during the printing process, thereby increasing manufacturing costs.

SUMMARY

Several aspects of a variable beam geometry laser-based PBF and systems and methods for manufacturing therewith will be described more fully hereinafter.

In an aspect of the present disclosure, an apparatus for laser-based powder-bed fusion is presented. The apparatus includes a depositor that deposits a plurality of layers of a powder material. The apparatus also includes a laser beam source that generates a laser beam having a variable beam geometry. The apparatus further includes a laser application component (e.g., a deflector) that applies the laser beam in one of a plurality of beam geometries to fuse the powder material.

In another aspect of the present disclosure, a method of laser-based powder-bed fusion is presented. The method includes adapting a laser beam geometry to form an adapted laser beam comprising a line or a two dimensional shape. The method further includes applying the adapted laser beam to at least a portion of a powder material to scan at least a portion of the defined build piece.

Other aspects will become readily apparent to those skilled in the art from the following detailed description, wherein is shown and described only several exemplary embodiments by way of illustration. As will be realized by those skilled in the art, concepts described herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of the concepts described herein will now be presented in the detailed description by way of example, and not by way of limitation, in the accompanying drawings, wherein.

DETAILED DESCRIPTION

The detailed description set forth below in connection with the appended drawings is intended to provide a description of various exemplary embodiments of the concepts disclosed herein and is not intended to represent the only embodiments in which the disclosure may be practiced. The term "exemplary" used in this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

While this disclosure is generally directed to laser-based PBF (L-PBF) systems, it will be appreciated that such L-PBF systems may encompass a wide variety of AM techniques. Thus, the L-PBF process may include, among others, the following printing techniques: Direct metal laser sintering (DMLS), Selective laser melting (SLM) and Selective laser sintering (SLS). Still other PBF processes to which the principles of this disclosure are pertinent include those that are currently contemplated or under commercial development. While the specific details of each such process are omitted to avoid unduly obscuring key concepts of the disclosure, it will be appreciated that the claims are intended to encompass such techniques and related structures.

L-PBF systems can produce metal and polymer structures (referred to as build pieces) with geometrically complex shapes, including some shapes that are difficult or impossible to create using conventional manufacturing processes. L-PBF systems create build pieces layer-by-layer, i.e., slice-by-slice. Each slice may be formed by a process of depositing a layer of metal powder and fusing (e.g., melting and cooling) areas of the metal powder layer that coincide with the cross-section of the build piece in the slice. The process may be repeated to form the next slice of the build piece, and so on, until all the layers are deposited and the build piece is complete.

Aspects of the present disclosure are directed to laser spot geometries for laser-based PBF (L-PBF) systems which may increase build rate and provide additional control and flexibility of the manufacturing process. A laser spot is the area of a surface illuminated by a laser. Rather than use a laser beam configured as terminating in a tiny, almost point-like spot with a small radius that remains constant over time, a laser beam may instead be configured to use variable beam or spot geometries. For example, the beam geometry—that is, the area of the surface of the print material illuminated by the laser—may be a line, a square, a rectangle, a triangle, an asymmetrical shape, or any other two-dimensional shape. The identified beam geometry can then be applied to the surface of the print material using two-dimensional scanning. In so doing, the laser beam may be applied in a PBF print operation such that a larger contiguous area of the powder-bed may be processed at any given time. In an embodiment, the beam geometry can be dynamically altered during a 3-D print operation. Thus, for example, the L-PBF 3-D printer may fuse larger areas using a correspondingly large beam geometry, and subsequently or periodically, the 3-D printer may alter the beam geometry to a small line or an ordinary point-like shape to scan corner portions of the object and/or to fuse details of the build piece on a smaller scale.

In accordance with aspects of the present disclosure, the laser beam geometry may be adapted based on the geometry of the object (build piece) to be produced. The laser beam geometry may be adapted at the beginning of a scan, on a slice-by slice basis, at a designated time within a slice, or dynamically on the fly. Further, the laser beam geometry may also be varied continuously as the laser scans across the powder-bed, whose variance is in accordance with the contemplated structure of the object as identified in a computer aided design (CAD) profile, for example.

Employing the variable beam geometry may beneficially increase the throughput of the L-PBF process. Additionally, adapting the beam geometry as described herein may allow for application of laser power over a larger area to the powder bed, meaning that energy flux can be kept small to reduce vaporization of materials. Furthermore, given the two-dimensional nature of the adapted laser spot geometry, the energy profile of the spot geometry may be adjusted according to the scan vector (direction of scanning), to provide heating and cooling rate control. Controlling the cooling rate during the solidification process may allow reduction of thermal stresses and alterations of microstructure in the resultant component to achieve desired material properties.

FIGS. 1A-D illustrate respective side views of an exemplary laser-based PBF (L-PBF) system 100 during different stages of operation. As noted above, the particular embodiment illustrated in FIGS. 1A-D is one of many suitable examples of a L-PBF system employing principles of this disclosure. It should also be noted that elements of FIGS. 1A-D and the other figures in this disclosure are not necessarily drawn to scale, but may be drawn larger or smaller for the purpose of better illustration of concepts described herein. L-PBF system 100 may include a depositor 101 that may deposit each layer of powder material, a laser beam source 103 that may generate a laser beam, a beam shaping component 104 that may shape the laser beam according to a selected beam geometry, a deflector 105 that may apply the laser beam in the form of the selected beam geometry to fuse the powder material, and a build plate 107 that may support one or more build pieces, such as a build piece 109.

Figure 1A:
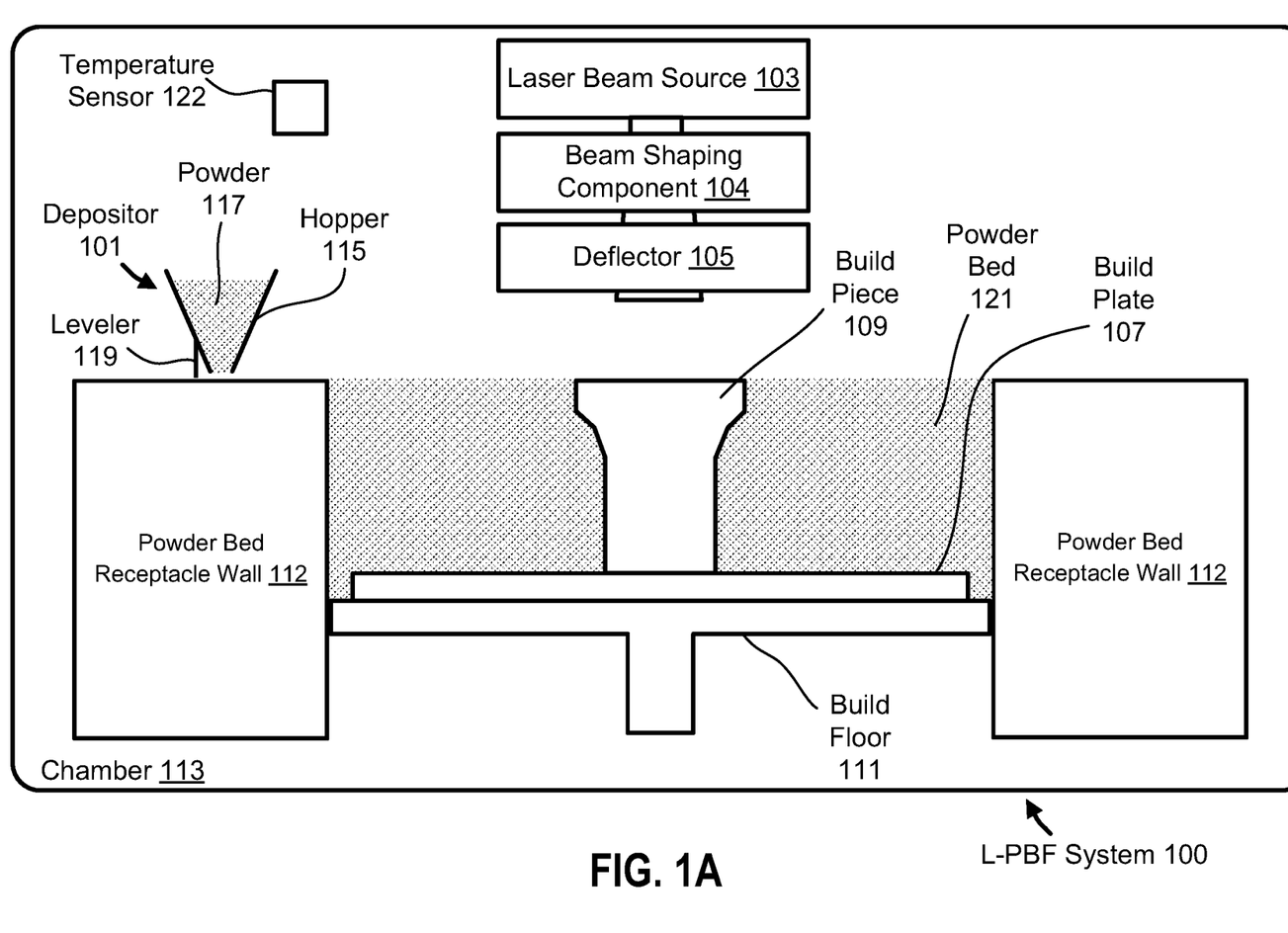
FIGS. 1A-D illustrate respective side views of an exemplary PBF system during different stages of operation.

The L-PBF system 100 may also include a build floor 111 positioned within a powder bed receptacle. The walls of the powder bed receptacle 112 may generally define the boundaries of the powder bed receptacle, which is defined between the walls 112 from the side and a portion of the build floor 112 below. The build floor 111 may progressively lower build plate 107 such that depositor 101 may deposit a next layer of powder material. The L-PBF system 100 may additionally include a chamber 113 that may enclose the other components of L-PBF system 100 (e.g., laser beam source 103, beam shaping component 104 and deflector 105), thereby protecting such other components, enabling atmospheric and temperature regulation and mitigating contamination risks. Further, the L-PBF system 100 may include a temperature sensor 122 to monitor the atmospheric temperature, the temperature of the powder material 117 and/or components of the L-PBF system 100. Depositor 101 may include a hopper 115 that contains a powder 117, such as a metal powder, for example. The depositor 101 may also include a leveler 119 that may level the top of each layer of deposited powder (see e.g., powder layer 125 of FIG. 1C) by displacing deposited powder 117 above a predefined layer height (e.g., corresponding to powder layer thickness 123 of FIG. 1B).

Referring specifically to FIG. 1A, this figure shows L-PBF system 100 after a slice of build piece 109 has been fused, but before the next layer of powder 117 has been deposited. In fact, FIG. 1A illustrates a time at which L-PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
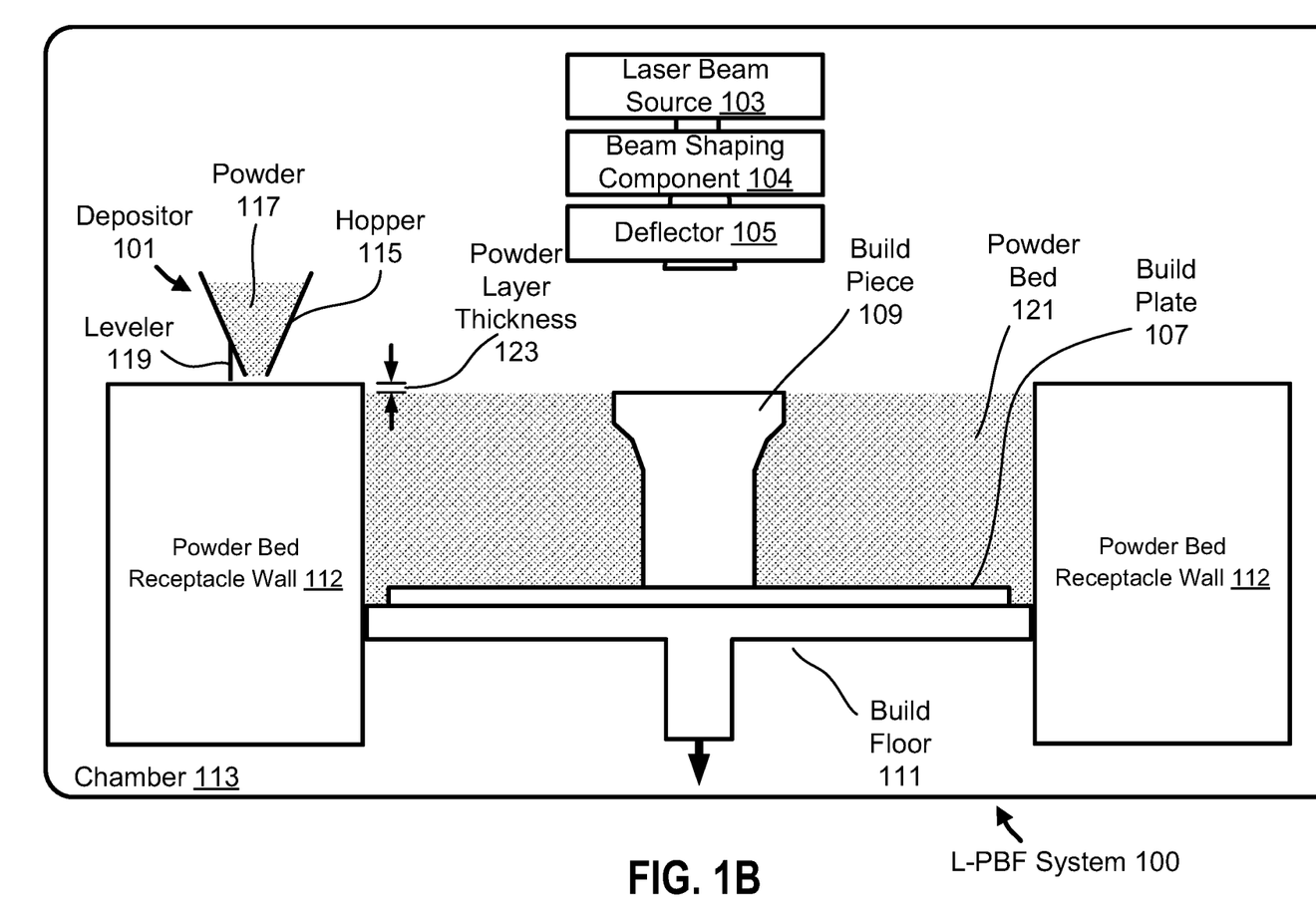

FIG. 1B shows L-PBF system 100 at a stage in which build floor 111 may lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
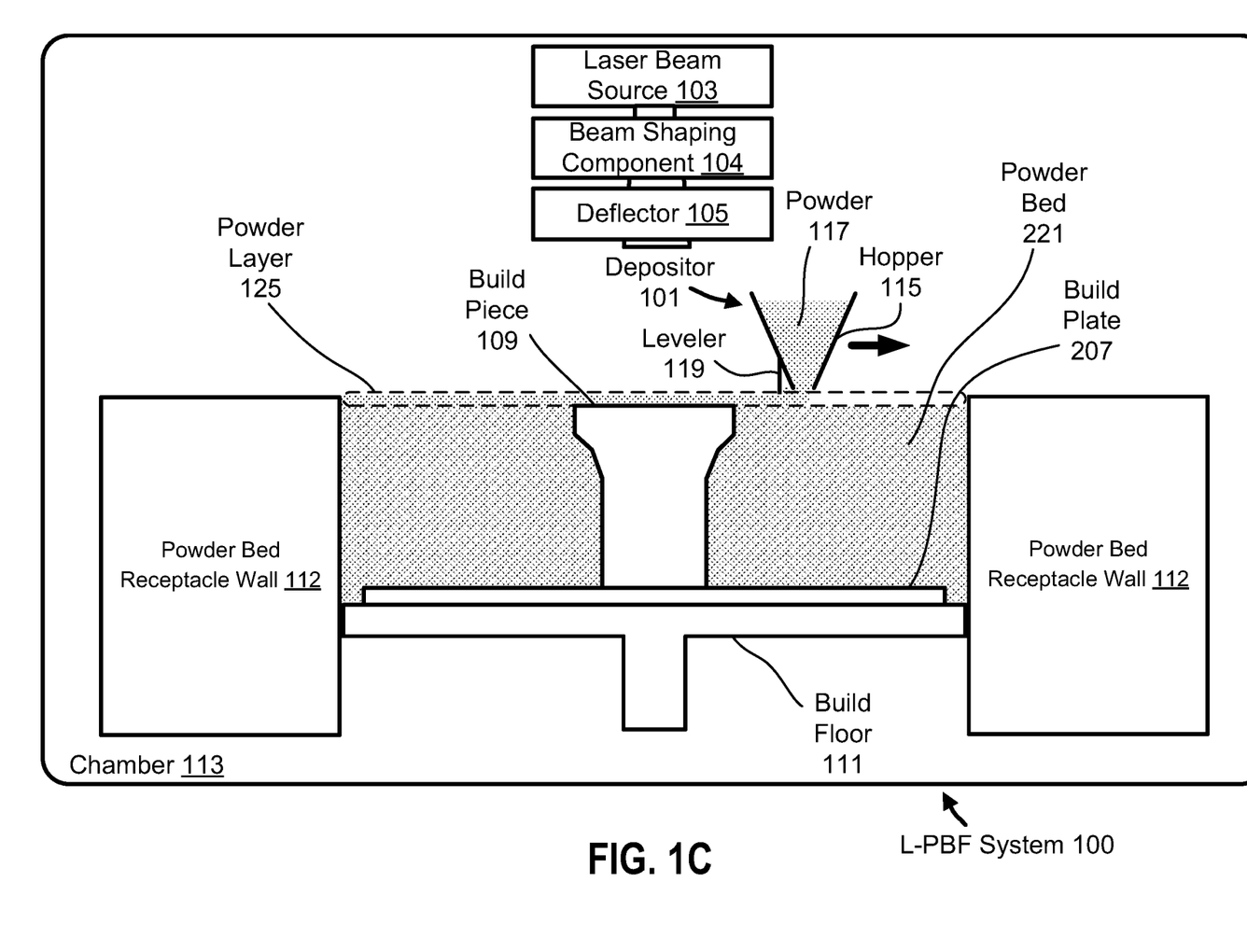

FIG. 1C shows L-PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that has a thickness of substantially equal to the powder layer thickness 123 (see FIG. 1B). Thus, the powder 117 in L-PBF system 100 may be supported by a powder material support structure, which may include, for example, a build plate 107, a build floor 111, a build piece 109, walls 112, and the like. It should be noted that the illustrated thickness of powder layer 125 (e.g., powder layer thickness 123 of FIG. 1B) may be greater than an actual thickness used for the example involving 150 previously-deposited layers discussed above with reference to FIG. 1A.

Figure 1D:
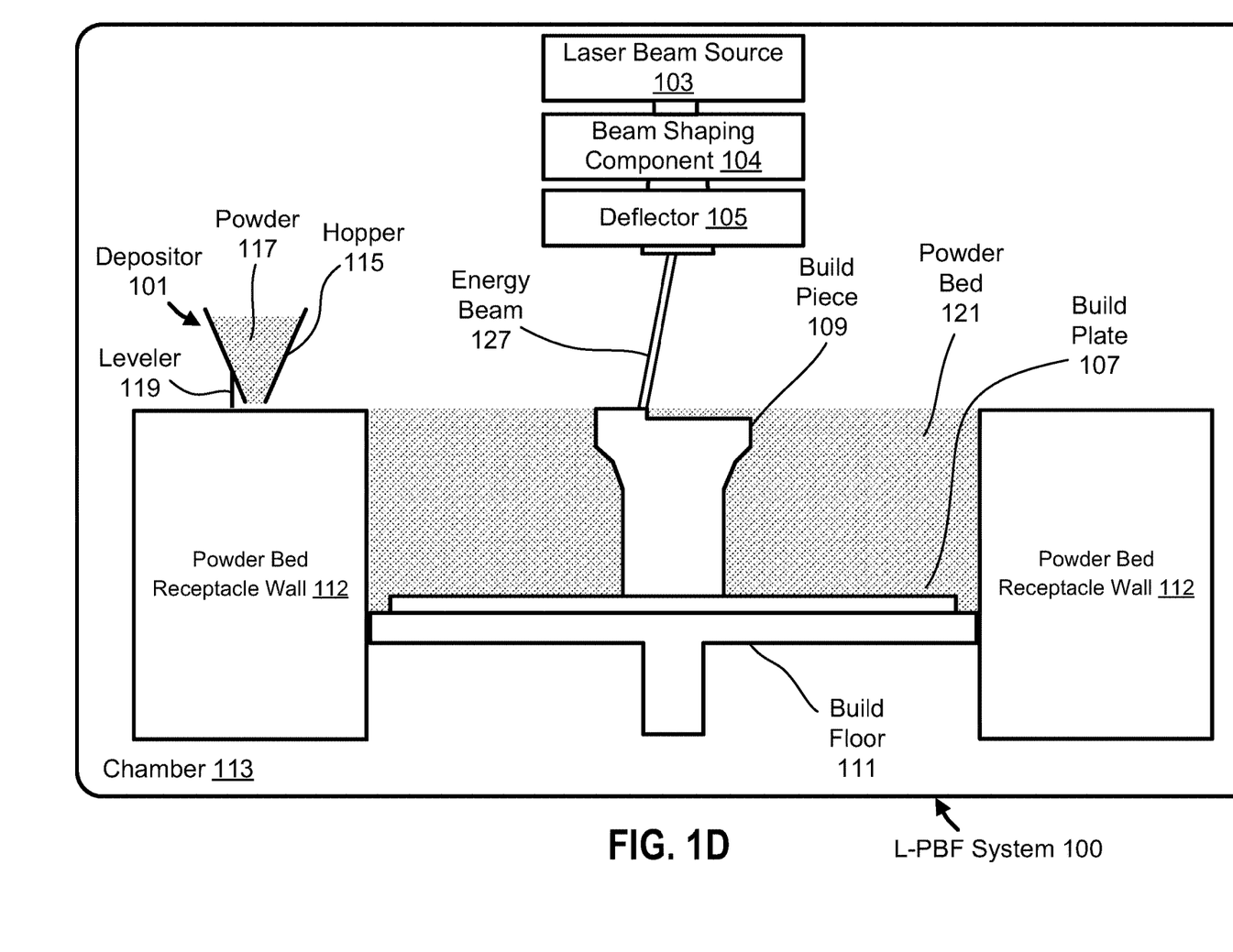

FIG. 1D illustrates the L-PBF system 100 generating a next slice in build piece 109 following the deposition of powder layer 125 (FIG. 1C). Referring to FIG. 1D, the laser beam source 103 may generate a laser beam. The beam shaping component 104 may be used to vary the geometric shape of the laser beam to be in the form of a line, a square, a rectangle, or other two-dimensional shape. In some aspects, the beam shaping component 104 may shape the laser beam through phase plates and free spacing propagation. The beam shaping component 104 may include multiple diffracting, reflecting and refracting apparatus, such as diffractive beam splitters, diffractive diffusers, phase plates, lenses, mirrors or other optical elements. Changes in the size and geometry of the laser beam 127 may, for example, be achieved by motorized displacement of the optical elements of beam shaping component 104 as discussed further below with reference to FIGS. 2A-B. In some aspects, the geometry of the beam shape may be set according to the build piece 109. The geometry of the beam shape may be modified on a slice-by slice basis based on the geometry of the build piece to reduce scan time for a particular layer. In some aspects, the geometry of the beam shape may also be modified mid-layer or even continuously throughout the scanning of the build piece 109.

Deflector 105 may apply the laser beam 127 in the selected geometric shape to fuse the next slice in build piece 109. In various embodiments, the deflector 105 may include one or more gimbals and actuators that can rotate and/or translate the laser beam source 103 and/or beam shaping component 104 to position the laser beam 127. In various embodiments, laser beam source 103, beam shaping component 104 and/or deflector 105 can modulate the laser beam, e.g., turn the laser beam on and off as the deflector scans such that the laser beam is applied only in the appropriate areas of the powder layer. For example, in various embodiments, the laser beam can be modulated by a digital signal processor (DSP).

As shown in FIG. 1D, much of the fusing of powder layer 125 occurs in areas of the powder layer that are on top of the previous slice, i.e., previously-fused powder. An example of such an area is the surface of build piece 109. The fusing of the powder layer in FIG. 1D is occurring over the previously fused layers characterizing the substance of build piece 109.

Figure 2A:
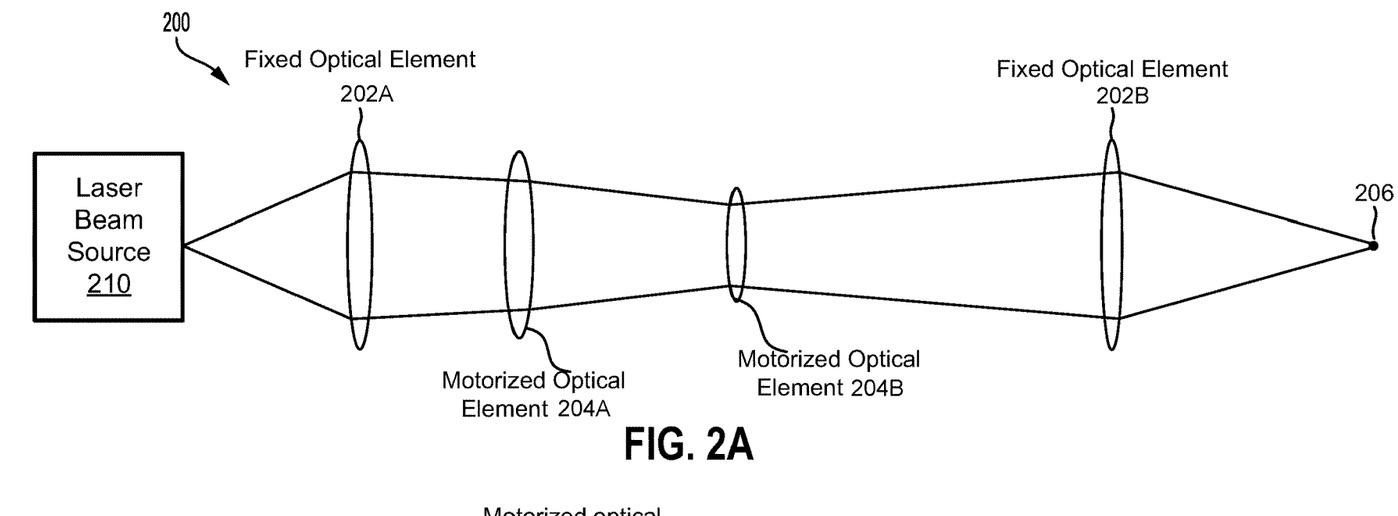
FIGS. 2A and 2B are diagrams illustrating an exemplary beam shaping component operated to change the geometry of a laser beam in accordance with aspects of the present disclosure.
Figure 2B:
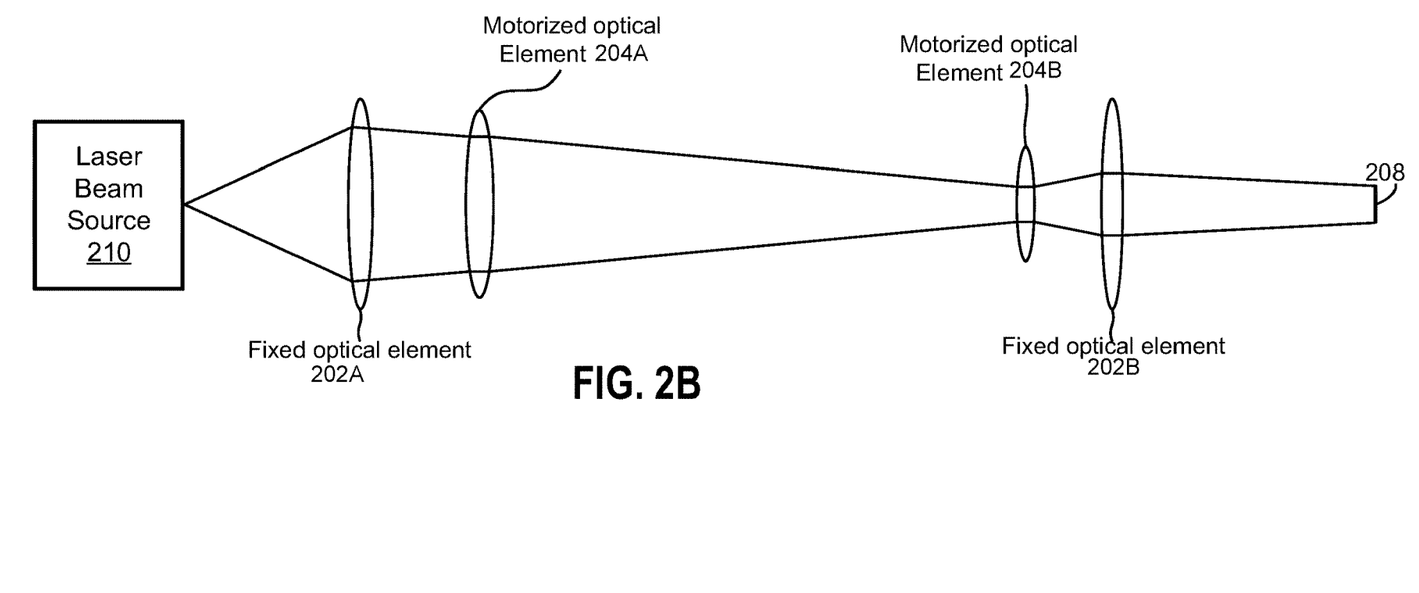

FIGS. 2A and 2B are diagrams illustrating an exemplary beam shaping component operated at two exemplary points in time to change the geometry of a laser beam in accordance with aspects of the present disclosure. Referring to FIGS. 2A-2B, the beam shaping component 200 may include fixed optical elements 202A, 202B and one or more motorized optical elements 204A, 204B. The optical elements 202A, 202b may have a fixed position such that optical elements 202A, 202B may not be displaced. Motorized optical elements 204A, 204B may each include an optical element (e.g., a lens) with a motor component (not shown) to adjust the position of the optical element of the motorized optical element (e.g., 204A) as a function of time. Although the exemplary beam shaping component 200 includes two motorized optical elements and two fixed optical elements, any number of such optical elements may be used to generate desired beam shape. Also, while for convenience and clarity the optical elements 202A,B and 204A,B are shown as circular symbols, these elements can take on any necessary or suitable physical form. Beam shaping may be achieved through phase plates and free spacing propagation. As such, beam shaping component 200 may include multiple diffracting, reflecting and refracting apparatus, such as diffractive beam splitters, diffractive diffusers, phase plates, lenses and mirrors. Of course, still other mechanisms may be used additionally or alternatively to achieve the desired beam geometry. For purposes of FIGS. 2A-B, the propagating light from the laser sources is represented generally by the lines originating at a laser beam sources 210 at the left, moving through the various optical elements in one or both directions (depending, for example, on whether the light or portions thereof is being reflected), and terminating in a desired pattern on the surface of the printed object (omitted for clarity) at the right of the figure.

As shown in FIG. 2A, a ray from a laser beam source 210 may be applied to the fixed optical element 202A. When a laser beam is applied initially to optical elements 202A, the laser beam may thereafter be alternately reflected and refracted via the fixed optical elements (e.g., 202A, 202B) and the presently stationary motorized optical elements (204A, 204B) to thereby produce a first laser spot 206. In FIG. 2B, the motorized optical elements 204A, 204B may be thereafter repositioned such that the geometric shape of the laser beam produced may be changed to a line 208. The size and geometry of the laser beam may be adjusted by displacement of the motorized optical elements. That is, the motorized or otherwise automated mechanism that may be included in each of the motorized optical elements 204A, 204B may be used to control the propagation space between optical elements such that the resultant beam size and shape may be modified to the desired form.

Figure 3:
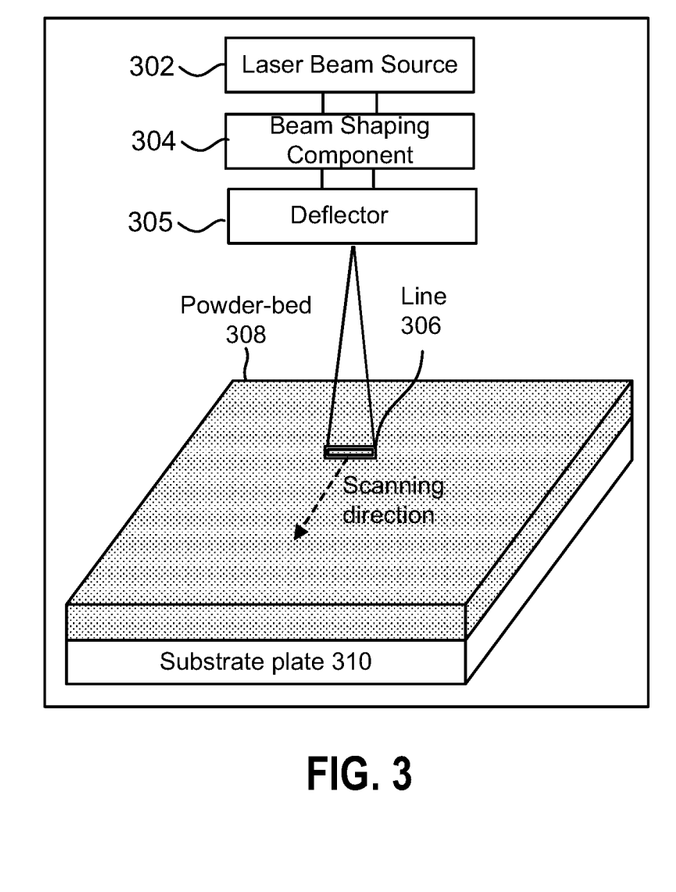
FIG. 3 is a diagram illustrating an exemplary L-PBF system for scanning a build piece in accordance with aspects of the present disclosure.

FIG. 3 is a diagram illustrating an exemplary L-BPF system for scanning a build piece in accordance with aspects of the present disclosure. Referring to FIG. 3, a laser beam source 302 may supply a laser beam to a beam shaping component 304. In this example, beam shaping component 304 may be configured similarly to beam shaping component 200 (FIG. 2A). However, other mechanisms may additionally or alternatively be used to adapt the geometrical shape of the laser beam. The beam shaping component 304 may modify the laser beam supplied by laser beam source 302 to generate a laser spot in the form of a line 306. The modified laser beam source 302 may be directed at deflector 305, which applies the modified laser beam 306 to the powder surface. By way of example only, the modified laser beam 306 may be configured in the form of a line that is 10 mm in length, 0.2 mm in width. The laser beam 306 may be applied to a powder bed 308 supported by a substrate plate 310. The laser beam 306 may scan across an area of the powder bed in a direction perpendicular to line 306 to fuse powder material in the powder bed 308 to form a slice or layer of a build piece according to a design profile, for example. Here, by adapting the geometry of the laser beam 306 to be in form of line rather than a point, the build rate may be increased and the production time may be reduced. For instance, using the exemplary laser beam, moving perpendicular to its length at a speed of 1200 mm/s, the L-BPF process may have a build rate of 2,000 $cm^3$/h at a layer thickness of 0.05 mm.

Figure 4:
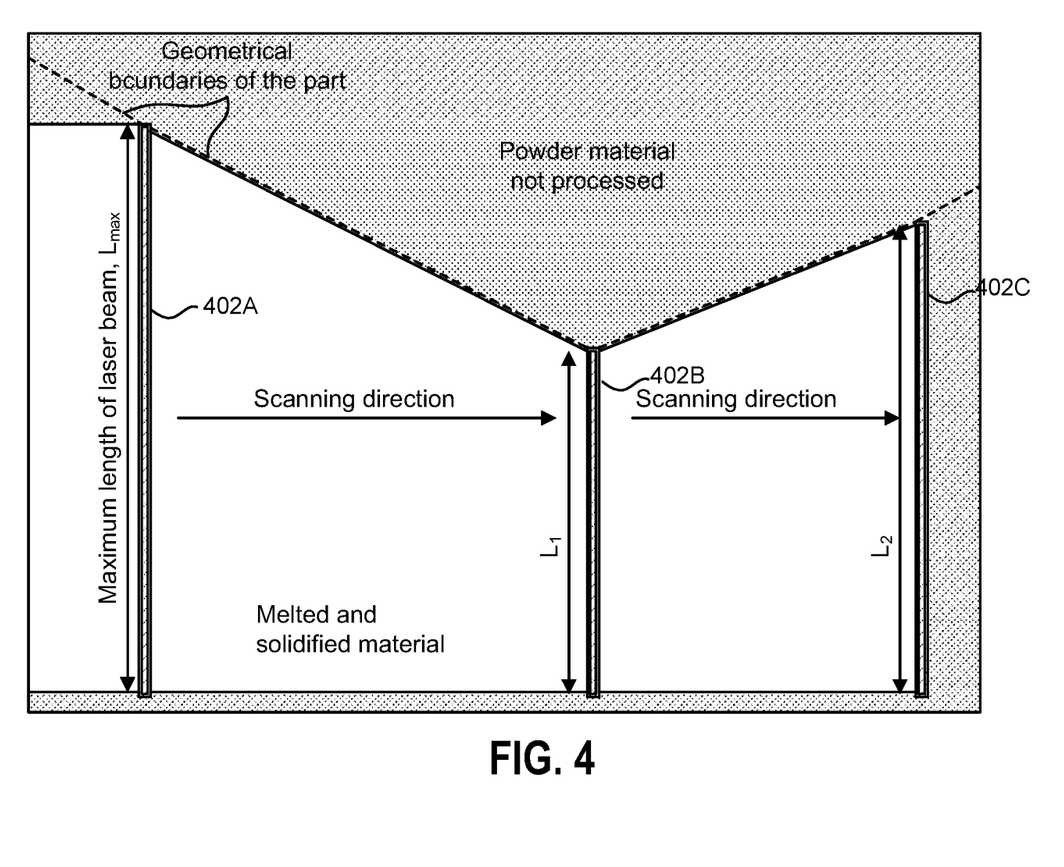
FIG. 4 illustrates an exemplary adaptation of a laser beam during a scan in accordance with aspects of the present disclosure.

In some aspects, the shape of the laser beam may be adapted based on the geometry of a desired part to be built. Referring to FIG. 4, the shape of a laser beam may be adapted such that the resultant laser spot is a line. The length of the laser spot line (e.g., 402A, 402B, and 402C) may be continuously modified (e.g., under the control of beam shaping component 104) based on the geometrical boundaries of the part to be built (e.g., build piece). At a first portion the length of the laser spot line 402A may be at a maximum $L_{max}$. Based on the geometry of the build piece as given by the designated geometrical boundary of the part, the length of the laser spot may be adapted such that the powder outside of the geometrical boundary is not be processed. Accordingly, as shown in FIG. 4, length of the laser beam may be continuously modified (e.g., progressively reduced) to follow the geometrical boundary of the part as the laser beam continues to scan the powder material in a direction perpendicular to its length until a second portion is reached. At the second portion, the laser beam 402B may be a length $L_1$ which is less than $L_{max}$. As the scan continues, the length of the laser beam may be further adapted (e.g., progressively increased) until a third portion of the build piece is reached. At the third portion, the length of laser beam 402C may be increased to length $L_2$. In some aspects, the power (P) of the laser may also be adjusted such that a laser power to length ratio may be maintained such that the overall energy flux remains constant during the scan.

Figure 5:
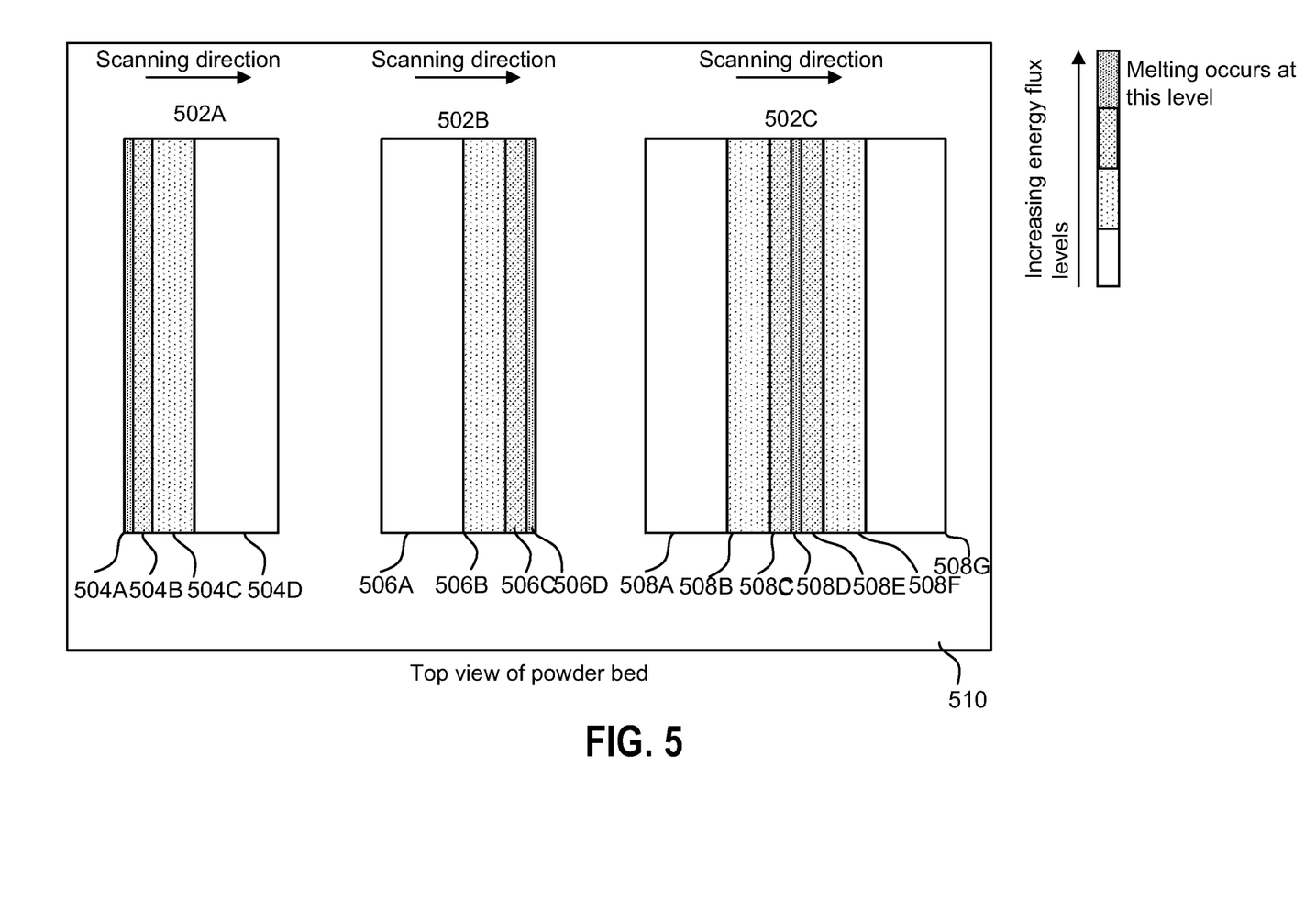
FIG. 5 is a diagram illustrating exemplary energy flux level configurations of a laser beam adapted for 2-D scanning in accordance with aspects of the present disclosure.

FIG. 5 is a diagram illustrating exemplary energy flux level configurations of a laser beam adapted for 2-D scanning. As discussed above, a laser beam may be transformed to have an essentially one dimensional (1-D) shape (approximated by a line) or a two-dimensional (2-D) shape. The beam shape in 2-D scanning may take on any 2-D shape, including, but not limited to rectangles, triangles, or other polygonal or geometric shapes. Lower energy levels may be applied to portions of the 1-D or 2-D shape. In one example, applying a laser beam with different energy levels for different portions of the 2-D shape may be used to provide preheating of the powder material and/or to provide cooling rate control based on the laser beam's relative direction to the region of peak energy flux.

Referring to FIG. 5, energy flux level configurations are provided for three exemplary rectangular laser beam shapes 502A, 502B, and 502C. Rectangular laser beam 502A is divided into four regions. Each of the regions may be configured to have different sizes with different energy flux levels. By way of example only, a rectangular laser spot may be configured to be 10 mm in length and 5 mm in width with varying energy levels across its width. Of course, the number and size of the regions are merely exemplary and any number and size of regions may be included in a laser beam shape. Similarly, although the beam shapes in the examples of FIG. 5 are rectangles, any multi-dimensional shape may be used. In other embodiments, each portion 504A, 504B, etc. may represent a discretely adapted geometric beam shape applied with a particular power.

In shaping the laser beam, an energy profile may be configured such that the energy levels may be adjusted along the width of the rectangle. In region 504A, the energy flux level may be increased to a level sufficient for melting the powder material (e.g., peak energy flux). Thereafter, in regions 504B, 504C, and 504D, the energy flux level is successively reduced in each region. Accordingly, when applied in a scan, the rectangular beam shape 502A may provide localized preheating of the powder material. That is, as rectangular beam shape 502A scans powder material in a powder bed, proceeding horizontally in a direction from left to right, the 2-D scan may progressively heat the powder in an area of a powder bed first applying 504D with the lowest energy flux level. As each successive region is applied to the same area of powder material, the energy flux level (e.g., laser beam intensity) may be increased and in turn, the temperature of the powder material may be increased. By configuring the energy profile for the laser beam to preheat the powder material before heating the powders to melting, thermal fluctuation and resultant thermal stresses may be reduced.

In rectangular laser beam shape 502B, four regions having different energy flux levels are shown. As the laser beam shape 502B scans powder material in a region of the powder bed, the energy flux level applied to the powder may be progressively reduced. For instance, region 506D may be applied to the region of the powder bed 510 to melt the powder material in the area. As the laser beam continues in the direction perpendicular to the width of laser beam 502B from left to right, a progressively lower energy flux level may be applied as regions 506C, 506B and 506A are applied to sequentially scan the material in the area. By configuring the energy profile for the laser beam shape 502B this way, a 2-D scan using laser beam shape 502B may provide control on the cooling rate of the solidified material. Controlling the cooling rate may reduce thermal stress and further enable production of the resultant microstructure of the build piece components to desired properties.

In some aspects, a laser beam may be configured with an energy profile to provide localized heating of powder material and cooling rate control after the powder material has been melted. As shown in FIG. 5, rectangular laser beam 502C includes seven regions. When applied to powder material in an area of powder bed 510, regions 508G, 508F, 508E progressively heat the powder material in the area prior to melting when region 508D scans the area. After region 508D scans the designated area of the powder bed 510, regions 508C, 508B, and 508A may be sequentially applied to progressively lower the applied energy flux level thereby controlling the cooling rate of the melted material. Accordingly, the energy flux level of the laser beam (e.g., 502A, 502B, or 502C) may be adjusted according to the material being processed to reduce thermal stresses commonly observed in parts fabricated by L-PBF processes.

Figure 6:
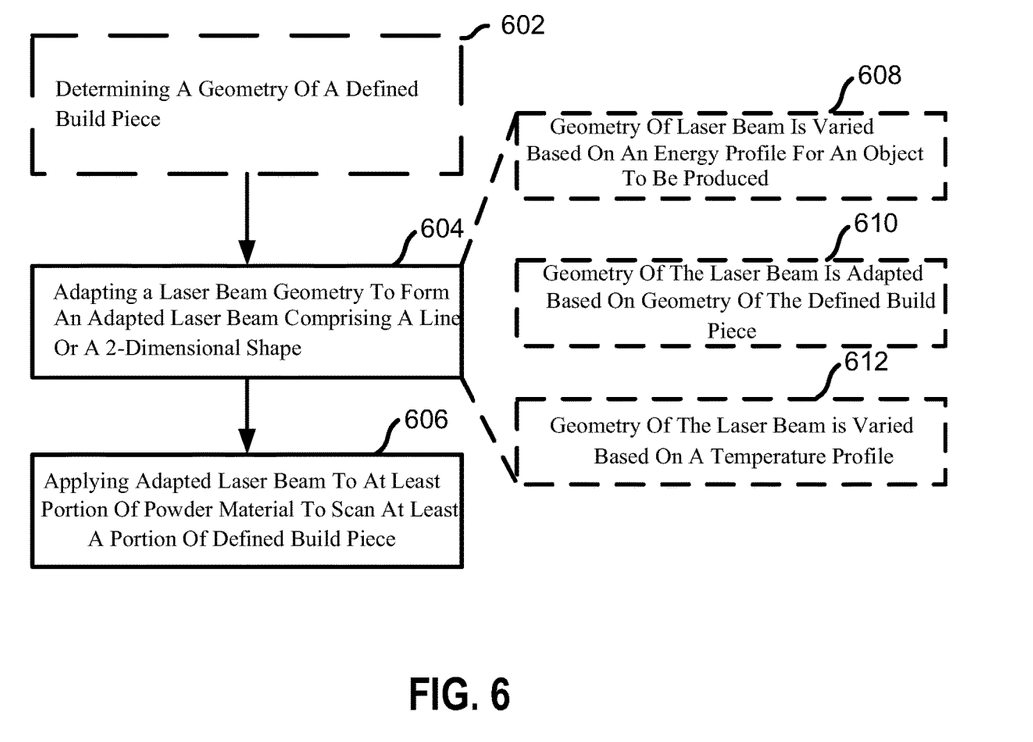
FIG. 6 is a flowchart of an exemplary method of configuring a laser beam to scan a build piece in a L-PBF apparatus.

FIG. 6 is a flowchart of an exemplary method of configuring a laser beam to scan a build piece in a L-PBF apparatus. A L-PBF apparatus may optionally determine a geometry of a defined build piece (602). The L-PBF apparatus may adapt a geometry of a laser beam to form an adapted laser beam comprising a line or a 2-D shape (604). For example, referring to FIGS. 2A-2B, the beam shaping component 200 may receive a laser beam from a laser beam source. The beam shaping component 200 may be configured with fixed optical elements (202A, 202B) and motorized optical elements (204A, 204B). The motorized optical elements (204A, 204B) may be moved or repositioned relative to the fixed optical elements (202A, 202B) to control the propagation space between optical elements (e.g., motorized and fixed optical elements) such that the resultant laser beam size and shape may be modified. Alternative techniques for adapting the desired laser beam shape may also be possible.

In some aspects, the geometry of the laser beam may be varied during application of the laser beam. For example, as shown in FIG. 4, a laser beam adapted to be in the form of a line (e.g., 402A, 402B, and 402C) may be continuously modified as the laser beam scans the powder material to generate a build piece. In the example of FIG. 4, the length of the laser spot line was modified as the scan progressed across the powder bed. However, the present disclosure is not so limiting and other modifications are contemplated. For example, the shape of the beam may also be adapted as the scan progresses. That is, the laser beam may be formed as a rectangle during one portion of a scan and may later be changed to a triangle shape at another portion of the scan. In some aspects, the laser beam may be adapted based on the geometry of the defined build piece (610). For example, the geometry of the desired build piece may be analyzed to determine the geometrical shape that may most efficiently (e.g., such that the completion time may be reduced or optimized) be used to scan the desired build piece. In another example, as shown in FIG. 4, the length of the laser spot line is adjusted based on a boundary specified for the part being built.

In some aspects, the laser beam geometry may be adapted based on an energy profile associated with the part being built (608). For instance, the melting point may vary based on the type of powder material (e.g., different metals) used for the desired build piece. The adapted laser beam geometry may be divided into regions. An energy profile may specify a different energy flux level to be applied via each of the different regions of the adapted laser beam. For example, as shown in FIG. 5, a rectangular laser beam 502A may be configured with four regions. In each of the regions 504B, 504C, and 504D, the energy flux level applied is successively reduced. Accordingly, when applied to powder (in reverse order), rectangular beam 502A progressively heats the powder. As each successive region (e.g., 504D→504C→504B→504A) is applied to the same area of powder material, the energy flux level (e.g., laser beam intensity) may be increased, and in turn, the temperature of the powder material may be increased. By adapting the laser beam with regions based on the energy profile, the laser beam may be configured to preheat the powder material before heating the powder to melting (via region 504A). Accordingly, thermal fluctuation and resultant thermal stresses in the resulting build piece may be reduced.

Furthermore, the energy profile may be used to adapt the laser beam in order to provide cooling control after the powder material has been melted. For example, as shown in FIG. 5, a rectangular laser beam 502B may be adapted and configured to include four regions having different energy flux levels. As the rectangular laser beam 502B scans powder material in a region of the powder bed, the energy flux level applied in each region of the laser beam to the powder may be progressively reduced. By controlling the cooling rate, thermal stresses in the resulting build piece may be further reduced.

The L-PBF apparatus may apply the adapted laser beam to at least a portion of a powder material to scan at least a portion of the defined build piece (606). For example, as shown in FIG. 3, a laser beam adapted to be in the form of a line (306) is applied to the powder material in powder bed 308 thereby melting the powder material to define a portion of the build piece. The adapted laser beam may be applied in a direction perpendicular to its length (e.g., a line) or its width. In this way, the adapted laser beam may be applied to a greater area during a scan thereby reducing production time.

In some aspects, the geometry of the laser beam may be adapted based on a temperature profile (612). For example, the temperature profile may include the temperature at which the powder material to be used for the build piece melts, as well as other thresholds (e.g., temperature at which the powder material evaporates). A temperature sensor such as temperature sensor 122A of FIG. 1A may monitor the temperature of the powder material in the powder bed. When the temperature reaches a critical point, the laser beam may be adapted (e.g., to reduce the energy flux of the laser beam).

In other embodiments, the 2-D shapes may be amorphous, asymmetrical, and need not be in the form of a known shape. In some embodiments, the CAD software or applications working in conjunction with the CAD software may determine an optimal sequence of varying shapes as a function of time for use in a 3-D print job. The software may take into account, among other variables, some or all of the factors described above, including temperature profiles, areas where pre-heating and/or pre-cooling are favorable, geometrical shape of the build object, desire to minimize vaporization effects, etc. The beam shaping component 104 (FIG. 1) may be built using various hardware elements referenced herein and implemented in the 3-D printer to adapt the geometrical shape of the beam. The beam shaping component 104 may be configured to change the beam shape over time, such as a continuous change of a length of a beam shape in the form of a line. Continuously moving motorized lens and other optical elements, in conjunction with fixed elements, may assist in providing the capability to change the beam shape with the progression of time. The CAD software and/or application software associated therewith may be used as a data model for providing instructions to the 3-D printer to operate the beam shaping component 104 and the power profile of the laser beam source 103 in a manner that will render the desired results for a given build piece.

While the laser beam source 103 and the beam shaping component 104 have been generally identified as separate components, in some exemplary embodiments the functionality of both components may be included as part of a single integrated structure without departing from the scope of the disclosure.

Various exemplary embodiments disclosed herein are directed to novel configurations of a laser with variable bean geometry in a L-PBF system.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other support structures and systems and methods for removal of support structures. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus for additively manufacturing a build piece, comprising:
   a depositor configured to deposit a layer of a powder material;
   a laser beam source configured to generate a laser beam to fuse a portion of the layer of powder material during a scanning stage; and
   a beam shaping component configured to shape a beam geometry of the laser beam during the scanning stage, wherein at a first time during the scanning stage the beam shaping component shapes the beam geometry into a first geometrical shape based on a first geometrical boundary of the build piece, and at a second time during the scanning stage the beam shaping component shapes the beam geometry into a second geometrical shape based on a second geometrical boundary of the build piece.

2. The apparatus of claim 1, wherein the first and second geometrical boundaries are based on a design profile for the build piece.

3. The apparatus of claim 1, wherein the beam shaping component is further configured to shape the beam geometry based on an energy profile for the build piece.

4. The apparatus of claim 1, wherein at least the first or second geometrical shape comprises a two-dimensional shape.

5. The apparatus of claim 1, wherein at least the first or second geometrical shape comprises a line.

6. The apparatus of claim 5, wherein a length of the line is variable based on an energy profile of the laser beam.

7. The apparatus of claim 3, wherein the laser beam includes at least a first portion of the beam geometry and a second portion of the beam geometry, and the energy profile includes a first portion of the energy profile associated with the first portion of the beam geometry and a second portion of the energy profile associated with the second portion of the beam geometry, wherein the first portion of the energy profile is different from the second portion of the energy profile.

8. The apparatus of claim 7, wherein the first portion of the energy profile and the second portion of the energy profile are configured based at least in part on a temperature profile.

9. The apparatus of claim 7, wherein the laser beam source is configured to provide a constant energy flux between the first portion of the energy profile and the second portion of the energy profile.

10. The apparatus of claim 7, wherein the first portion of the energy profile is configured to preheat the powder material and the second portion of the energy profile is configured to fuse the powder material.

11. The apparatus of claim 7, wherein the first portion of the energy profile is configured to fuse the powder material and the second portion of the energy profile is configured to reduce an energy flux to control cooling of the fused powder material.

12. The apparatus of claim 1, further comprising a controller coupled to the laser beam source and configured to control a power density of the laser beam.

13. The apparatus of claim 1, wherein the beam shaping component is further configured to shape the beam geometry based on a temperature profile for the build piece.

14. The apparatus of claim 1, wherein the beam shaping component comprises at least one of each of a fixed optical element and a motorized optical element aligned to encompass the laser beam.

15. The apparatus of claim 14, wherein at least one of the optical elements comprises a lens.

16. A method of additively manufacturing a build piece, comprising:
    shaping a geometrical shape of a beam geometry of a laser beam into a first geometrical shape to form a first adapted laser beam such that a boundary of the first geometrical shape matches a boundary of a first geometry of the build piece;
    applying the first adapted laser beam to fuse a first portion of powder material to form a first portion of the build piece;
    changing the geometrical shape of the beam geometry of the laser beam from the first geometrical shape to a second geometrical shape to form a second adapted laser beam such that a boundary of the second geometrical shape matches a boundary of a second geometry of the build piece; and
    applying the second adapted laser beam to fuse a second portion of powder material to form a second portion of the build piece.

17. The method of claim 16, wherein changing the geometrical shape further comprises obtaining an energy profile for the build piece, wherein the second adapted laser beam is formed based on the energy profile.

18. The method of claim 16, wherein at least the first or second geometrical shape comprises a two-dimensional shape.

19. The method of claim 16, wherein the first geometrical shape comprises a line, and applying the first adapted laser beam further comprises applying the first adapted laser beam in a direction perpendicular to a length of the line.

20. The method of claim 19, further comprising varying a length of the line based on an energy profile of the first adapted laser beam.

21. The method of claim 16, wherein at least the first or second adapted laser beam includes at least a first portion and a second portion, and an energy profile of the first portion is different than the energy profile of the second portion.

22. The method of claim 21, wherein the energy profile of the first portion and the energy profile of the second portion are configured based at least in part on a temperature profile.

23. The method of claim 21, wherein the energy profile of the first portion and the energy profile of the second portion are configured to provide a constant energy flux between the first portion and the second portion.

24. The method of claim 21, wherein the first portion is configured to preheat the powder material and the second portion is configured to fuse the powder material.

25. The method of claim 21, wherein the first portion is configured to fuse the powder material and the second portion is configured to reduce an energy flux to control cooling of the fused powder material.

26. The method of claim 16, further comprising obtaining an overall geometry of the build piece and determining the first and second geometries of the build piece based on the overall geometry of the build piece.

27. The apparatus of claim 1, wherein the beam shaping component is configured to shape the beam geometry into the first geometrical shape such that at least a portion of the first geometrical shape matches the first geometrical boundary of the build piece.

28. The apparatus of claim 27, wherein the first geometrical shape is a line having a first length, and the second geometrical shape is a line having a second length, wherein the first and second lengths are different.

29. The apparatus of claim 1, wherein at least the first or second geometrical shape includes at least a line, a square, a rectangle, a triangle, or a polygon.

30. The apparatus of claim 1, wherein at least the first or second geometrical shape is an amorphous shape.

31. The apparatus of claim 1, wherein at least the first or second geometrical shape is an asymmetrical shape.

32. The apparatus of claim 1, wherein the first geometrical shape is a rectangle and the second geometrical shape is a triangle.

33. The apparatus of claim 1, wherein the first geometrical shape is a first amorphous shape and the second geometrical shape is a second amorphous shape.

34. The apparatus of claim 1, wherein the first geometrical shape is a first asymmetrical shape and the second geometrical shape is a second asymmetrical shape.

35. The apparatus of claim 1, wherein the beam shaping component is configured to change the shape of the beam geometry continuously during at least a portion of the scanning stage.

36. The method of claim 16, wherein at least the first or second geometrical shape includes at least a line, a square, a rectangle, a triangle, or a polygon.

37. The method of claim 16, wherein at least the first or second geometrical shape is an amorphous shape.

38. The method of claim 16, wherein at least the first or second geometrical shape is an asymmetrical shape.

39. The method of claim 16, wherein the first geometrical shape is a rectangle and the second geometrical shape is a triangle.

40. The method of claim 16, wherein the first geometrical shape is a first amorphous shape and the second geometrical shape is a second amorphous shape.

41. The method of claim 16, wherein the first geometrical shape is a first asymmetrical shape and the second geometrical shape is a second asymmetrical shape.

42. The method of claim 16, wherein the adapting includes dynamically configuring a plurality of optical elements and at least one optical element is motorized and configured to move to vary a shape of the beam geometry based on a geometry of the build piece to be produced.

* * * * *